United States Patent
Aldred et al.

(10) Patent No.: US 10,175,696 B2
(45) Date of Patent: Jan. 8, 2019

(54) APPARATUS FOR GUIDING AN AUTONOMOUS VEHICLE TOWARDS A DOCKING STATION

(71) Applicant: Dyson Technology Limited, Wiltshire (GB)

(72) Inventors: Michael David Aldred, Swindon (GB); Simon Edwards-Parton, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 7 days.

(21) Appl. No.: 14/890,414

(22) PCT Filed: Apr. 25, 2014

(86) PCT No.: PCT/GB2014/051289
§ 371 (c)(1),
(2) Date: Nov. 10, 2015

(87) PCT Pub. No.: WO2014/181083
PCT Pub. Date: Nov. 13, 2014

(65) Prior Publication Data
US 2016/0091899 A1 Mar. 31, 2016

(30) Foreign Application Priority Data
May 10, 2013 (GB) .................................. 1308450.4

(51) Int. Cl.
*G05D 1/02* (2006.01)
*B60L 1/00* (2006.01)
(Continued)

(52) U.S. Cl.
CPC .............. *G05D 1/0225* (2013.01); *B25J 5/00* (2013.01); *B25J 9/0003* (2013.01); *B25J 9/1697* (2013.01);
(Continued)

(58) Field of Classification Search
None
See application file for complete search history.

(56) References Cited

U.S. PATENT DOCUMENTS 6,078,849 A 6/2000 Brady et al.
6,362,875 B1 * 3/2002 Burkley ............... G05D 1/0246
356/139.03
(Continued)

FOREIGN PATENT DOCUMENTS

FR 2495797 A1 * 6/1982 ............ G01S 17/06
JP 7-191755 7/1995
(Continued)

OTHER PUBLICATIONS

Owen, C. B.; "What is the best fiducial?"; The First IEEE International Workshop Agumented Reality Toolkit; 2002; http://ieeexplore.ieee.org/stamp/stamp.jsp?tp=&arnumber=1107021&isnumber=24331.*
(Continued)

*Primary Examiner* — David P. Merlino
(74) *Attorney, Agent, or Firm* — Morrison & Foerster LLP

(57) ABSTRACT

An apparatus for guiding an autonomous vehicle towards a docking station including an autonomous vehicle with a camera-based sensing system, a drive system for driving the autonomous vehicle, and a control system for controlling the drive system. The apparatus includes a docking station including a first fiducial marker and a second fiducial marker, wherein the second fiducial marker is positioned on the docking station to define a predetermined relative spacing with the first fiducial marker, wherein the control system is operable to receive an image provided by the camera-based sensing system, the image including a representation of the first and second fiducial markers, and to control the drive system so as to guide the autonomous vehicle towards
(Continued)

the base station based on a difference between the representation of the first and second fiducial markers in the received image and the predetermined relative spacing between the first and second fiducial markers.

18 Claims, 9 Drawing Sheets

(51) Int. Cl.
| | | |
|---|---|---|
| *B60L 11/18* | (2006.01) | |
| *B60L 15/20* | (2006.01) | |
| *B25J 5/00* | (2006.01) | |
| *B25J 9/00* | (2006.01) | |
| *B25J 9/16* | (2006.01) | |
| *G05D 1/00* | (2006.01) | |
| *G06T 7/73* | (2017.01) | |

(52) U.S. Cl.
CPC ........... *B60L 1/003* (2013.01); *B60L 11/1805* (2013.01); *B60L 11/1816* (2013.01); *B60L 11/1824* (2013.01); *B60L 15/2036* (2013.01); *G05D 1/0088* (2013.01); *G05D 1/0234* (2013.01); *G06T 7/73* (2017.01); *B60L 2200/40* (2013.01); *B60L 2220/44* (2013.01); *B60L 2240/62* (2013.01); *B60L 2250/12* (2013.01); *B60L 2250/16* (2013.01); *B60L 2260/32* (2013.01); *G05D 2201/0215* (2013.01); *G06T 2207/10016* (2013.01); *G06T 2207/30204* (2013.01); *G06T 2207/30252* (2013.01); *Y02T 10/645* (2013.01); *Y02T 10/7005* (2013.01); *Y02T 10/7072* (2013.01); *Y02T 10/72* (2013.01); *Y02T 10/7275* (2013.01); *Y02T 10/7291* (2013.01); *Y02T 90/121* (2013.01); *Y02T 90/14* (2013.01); *Y02T 90/16* (2013.01); *Y02T 90/162* (2013.01); *Y10S 901/01* (2013.01)

(56) References Cited

U.S. PATENT DOCUMENTS

| | | | |
|---|---|---|---|
| 6,764,373 | B1 | 7/2004 | Osawa et al. |
| 9,131,119 | B2 * | 9/2015 | Friend ................. G05D 1/0225 |
| 2004/0012362 | A1 | 1/2004 | Tsurumi |
| 2004/0028258 | A1 * | 2/2004 | Naimark ............. G06K 9/4609 382/103 |
| 2007/0021869 | A1 * | 1/2007 | Baek .................... G05D 1/0225 700/245 |
| 2012/0265391 | A1 | 10/2012 | Letsky |
| 2012/0320206 | A1 * | 12/2012 | Sim ............................ G06T 7/73 348/148 |
| 2012/0323365 | A1 | 12/2012 | Taylor et al. |
| 2014/0005807 | A1 * | 1/2014 | Busschaert ............ G05B 19/02 700/83 |
| 2014/0100693 | A1 * | 4/2014 | Fong ..................... G05D 1/0225 700/253 |
| 2016/0026185 | A1 * | 1/2016 | Smith ................... G05D 1/0244 356/614 |

FOREIGN PATENT DOCUMENTS

| | | | |
|---|---|---|---|
| JP | 2009-217456 | | 9/2009 |
| JP | 2012-208592 | | 10/2012 |
| WO | WO 8702484 A1 * | 4/1987 | ............ B66F 9/0755 |
| WO | WO-2014/055966 | | 4/2014 |

OTHER PUBLICATIONS

Gaillet Alain; Machine Translation of FR 2495797 A1; Jun. 1982; espacenet.com.*

Search Report dated Sep. 27, 2013, directed to GB Application No. 1308450.4; 1 page.

International Search Report and Written Opinion dated Jun. 18, 2014, directed to PCT Application No. PCT/GB2014/051289; 14 pages.

* cited by examiner

APPARATUS FOR GUIDING AN AUTONOMOUS VEHICLE TOWARDS A DOCKING STATION

REFERENCES TO RELATED APPLICATIONS

This application is a national stage application under 35 USC 371 of International Application No. PCT/GB2014/051289, filed Apr. 25, 2014, which claims the priority of United Kingdom Application No. 1308450.4, filed May 10, 2013, the entire contents of which are incorporated herein by reference.

FIELD OF THE INVENTION

The invention relates to a system in which a mobile robot may be guided towards, and to dock with, a docking station in order to achieve certain functions, for example to replenish a rechargeable power source of the mobile robot. The invention also relates to the docking station used in such a system.

BACKGROUND OF THE INVENTION

It is becoming commonplace for mobile robots to be used around the home. For example, there are mobile robots that are designed specifically for vacuum cleaning and also ones which are designed for floor mopping. Also, mobile robots may be used in the home as mobile sentries. Such mobile sentries are equipped with suitable sensor suites to enable them to navigate a household, or office space, autonomously and detect abnormal conditions such as elevated heat levels or intruders into the area.

Common to such mobile robots is the requirement for them to move autonomously and so they are typically equipped with a rechargeable power source in the form of a battery pack in order to decouple the robot from dependence on wall-mounted power sockets. Typically the robot will be configured with an internal power monitoring routine so that it has a level of self-awareness relating to the level of electrical power that remains. When power levels are low, the robot is able to make its way back to a docking station with which the robot can connect in order to replenish its battery pack.

Mobile robot docking stations principally are provided with an electrical charging system having a set of contacts. The contacts are engageable with complementary contacts on the robot in order to provide an electrical charging current to the robot. However, docking stations may also have the facility to provide radio signals, infra red guiding beams or other emissions in order to assist the robot in locating the docking station. However, with such complexity come drawbacks. Often, mobile docking stations are large bulky items which need to be placed close to a power socket in a room of a home. Their physical presence has a significant visual impact and this detracts from the overriding principle of mobile robots that they should minimize impact on the user.

It is with these issues in mind that the invention has been devised.

SUMMARY OF THE INVENTION

In a first aspect the invention provides apparatus for guiding an autonomous vehicle towards a docking station comprising an autonomous vehicle provided with a camera-based sensing system, a drive system for driving the autonomous vehicle, and a control system for controlling the drive system. The apparatus further includes a docking station including a first fiducial marker and a second fiducial marker, wherein the second fiducial marker is positioned on the docking station to define a predetermined relative spacing with the first fiducial marker, wherein the control system is operable to receive an image provided by the camera-based sensing system, the image including a representation of the first and second fiducial markers, and to control the drive system so as to guide the autonomous vehicle towards the base station based on a difference between the representation of the first and second fiducial markers in the received image and the predetermined relative spacing between the first and second fiducial markers.

The invention is useful in the context of a wide variety of semi- or fully-autonomous guided vehicles, but has particular utility in the field of domestic mobile robots. The invention provides a computationally less intensive heuristic control scheme to guide a vehicle towards a docking station based on the observed relative spacing between a pair of fiducial markers, which may also be referred to as targets.

The apparatus may be further operable to store data relating to the predetermined relative spacing between the first fiducial marker and the second fiducial marker, search for and identify the first and second fiducial markers in the image, evaluate the relative position of the first and second fiducial markers in the image, compare the evaluated relative position of the first and second fiducial markers to the predetermined relative position of the first and second fiducial markers, and control the drive system in dependence on the comparison in order to guide the autonomous vehicle towards the base station.

In one embodiment, in order to obtain information relating to the distance between the vehicle and the docking station, the control system is operable to compare the relative distance between first fiducial marker and the second fiducial marker. Preferably, the control system identifies a centre point of each of the fiducial markers in order to make the comparison and calculates the pixel separation of the centre points of each of the fiducial markers as they appear in the captured image.

In order to obtain information regarding the lateral alignment of the vehicle to the docking station, the control system may compare the horizontal alignment between the first and second fiducial markers in the image. This may involve calculating the pixel distance heights of each of the first and second fiducial markers, comparing the difference between the two calculated pixel distance heights, and inferring guidance information based on the comparison.

Since the apparatus comprises an autonomous vehicle that is dockable with a docking station, the invention also resides in a docking station comprising a main body having a first fiducial marker and a second fiducial marker spaced a predetermined distance from the first fiducial marker.

Preferably, the first and second fiducial markers are located on a display portion of a docking station that is in a substantially upright position when the docking station is placed on a floor surface. Preferably, the display portion of the docking station is planar so as to provide a flat surface on which the markers may be displayed prominently and clearly which aids the camera-based sensing system in imaging the markers. In one embodiment, the display portion is pivotable with respect to a base portion of the docking station. This enables the docking station to be low profile in form.

In principle the fiducial markers may take many forms, simple or complex. However, although complex fiducial markers can convey much information, they are less robust to being captured accurately by a camera-based imaging system. In one embodiment, the fiducial markers define a pattern being in the form of a grid comprising four squares in a two-by-two arrangement. Preferably, alternate squares in the grid are contrasting colours, particularly black and white, to maximise the ability of the system to identify the markers in an image frame. Other options for the form of fiducial markers are circle-based and other polygonal-based markers, but the square patterned markers are currently as they can readily be identified by suitable feature detection algorithms.

Although the camera-based sensing system of the autonomous vehicle may comprise a monocular camera, in one embodiment the camera-based sensing system includes an omnidirectional camera such that a 360 degree scene image can be captured in a single frame.

The invention also resides in a method of controlling an autonomous vehicle to guide the vehicle towards a docking station, the docking station including a first fiducial marker and a second fiducial marker, wherein the second fiducial marker is positioned on the docking station to define a predetermined relative spacing with the first fiducial marker, the method comprising capturing an image including the docking station, controlling a drive system of the autonomous vehicle so as to guide the autonomous vehicle towards the base station based on a difference between the representation of the first and second fiducial markers in the received image and the predetermined relative spacing between the first and second fiducial markers.

BRIEF DESCRIPTION OF THE DRAWINGS

In order that the invention may be more readily understood, embodiments will now be described by way of example only with reference to the accompanying drawings, in which.

DETAILED DESCRIPTION OF THE INVENTION

Figure 1:
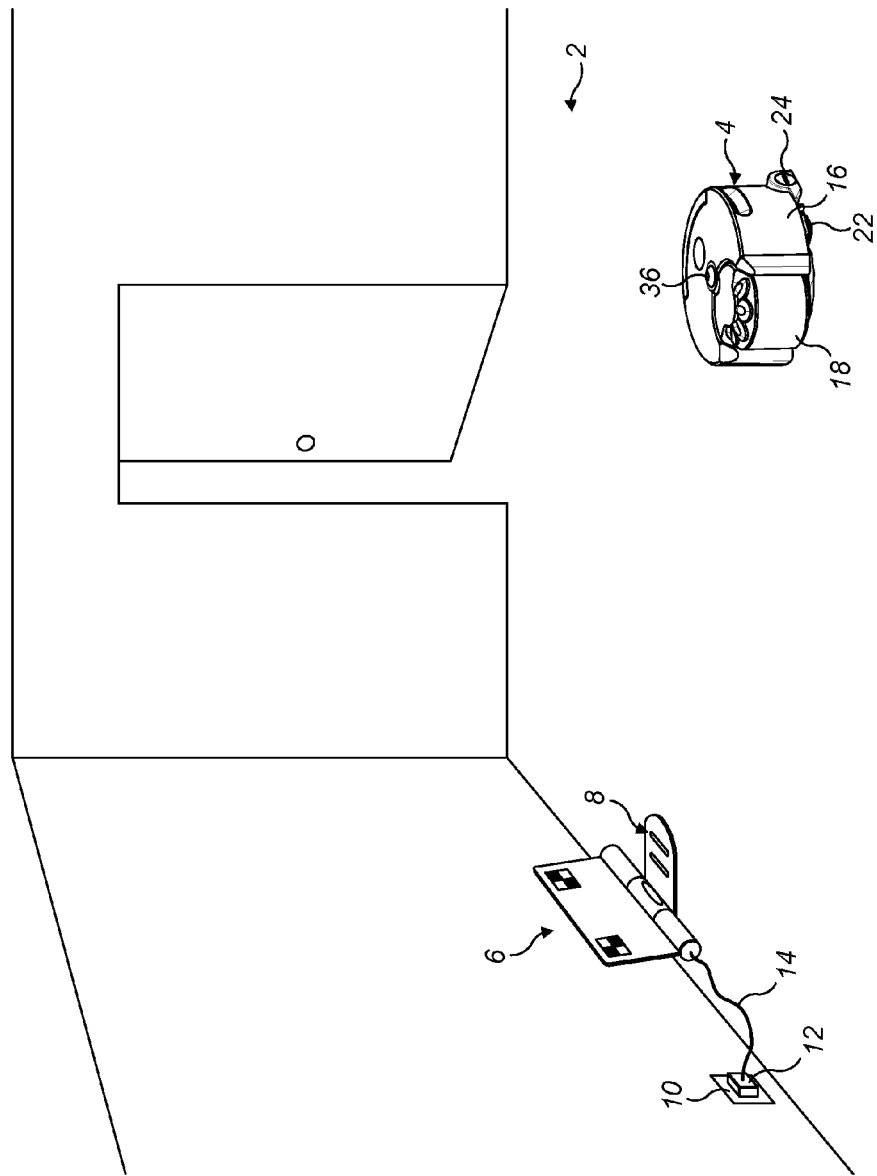
FIG. 1 is a perspective view of a room in which is located an exemplary robotic system comprising a mobile robot and a docking station in accordance with the invention.

With reference to FIG. 1 a robotic system 2 includes a mobile robot 4 and an associated docking station 6. In this embodiment, the mobile robot 4 is shown in the context of a vacuum cleaning robot although it should be appreciated that this is not essential to the invention and that the invention is applicable to any mobile robot, in a domestic setting or otherwise. The mobile robot 4 is autonomous and includes sufficient processing and sensing capability that enables the robot to navigate around the room, with the aid of a suitable on board navigation system, cleaning the floor as it goes.

The mobile robot 4 is powered by a rechargeable power source in the form of an internal battery pack (not shown in FIG. 1). Such a battery pack is generally known in the art and comprises a plurality of cells of a variety of cell chemistries. Cell chemistries in the lithium-ion family are currently preferred due to their high power density, low charge loss and lack of memory effect, although other cell chemistries such as nickel metal hydride and nickel cadmium are also acceptable.

The robot 4 is dockable with the docking station 6 so that it is able to recharge the battery pack when it nears a depleted state. The way in which the robot 4 moves to dock with the docking station 6 will be described in more detail later.

The docking station 6 is shown in FIG. 1 positioned against a wall of the room. The docking station 6 includes electrical contact means in the form of a pair of elongate electrical contacts 8 by which means the docking station 6 is able to provide charging energy to the robot 4 once it is in a docked position. The docking station 6 is attached to a mains electrical wall outlet 10 via a power supply 12 and cable 14 and, in this way, a source of power is provided to the electrical contacts 8 of the docking station 6.

Figure 2:
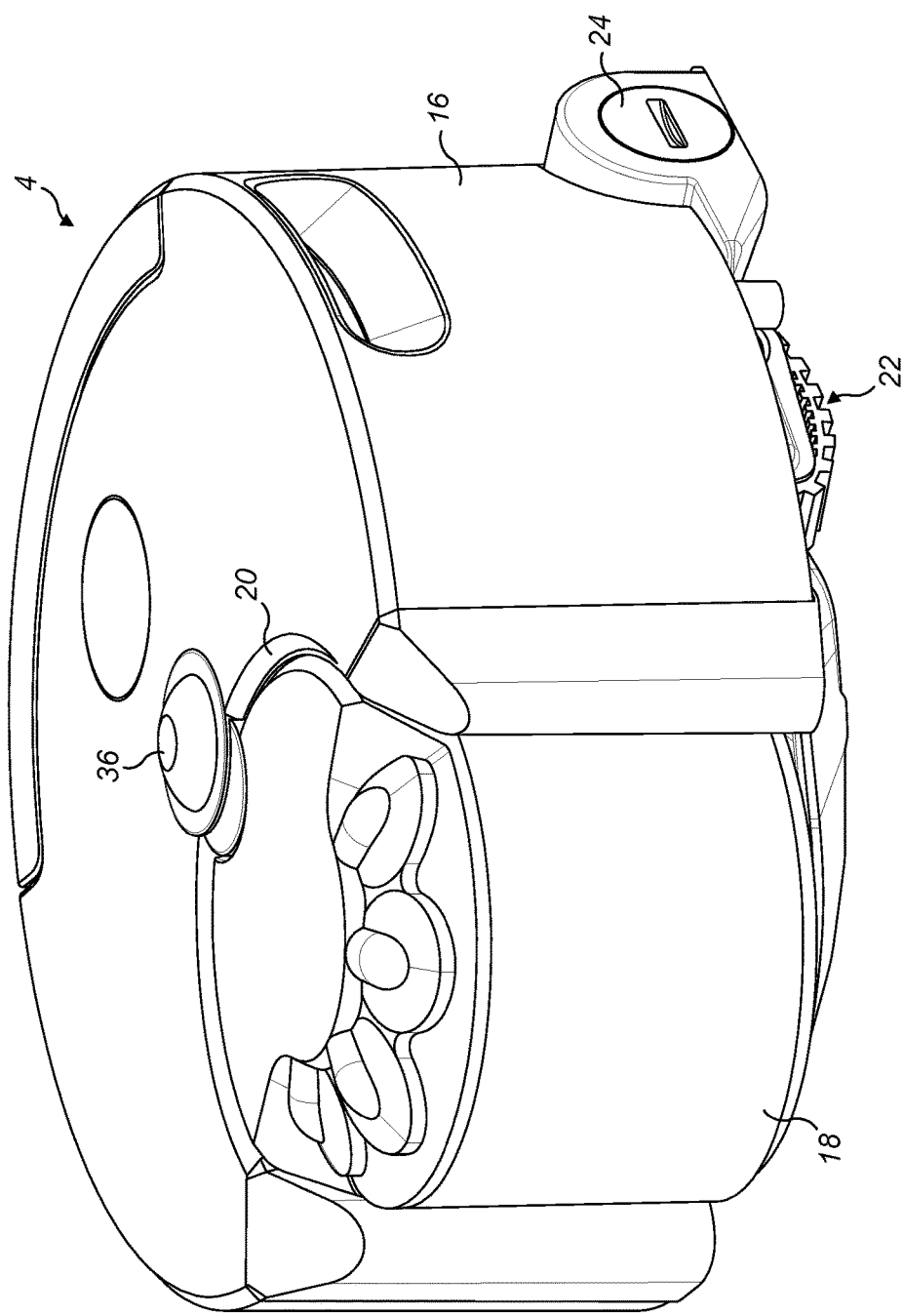
FIG. 2 is a perspective view of the robot in FIG. 1 in more detail.

The robot 4 is shown in more detail in FIG. 2. Here, the robot 4 has a generally circular main body 16 and a separating apparatus 18 that is carried on a forward part of the body 16 and which protrudes through a complementary shaped recess 20 of the main body 16.

For the purposes of this specification, the terms 'front' and 'rear' in the context of the robot will be used in the sense of its forward and reverse directions during operation, with the separating apparatus 18 being positioned at the front of the robot. Similarly, the terms 'left' and 'right' will be used with reference to the direction of forward movement of the robot.

The main body 16 supports several components of the robot and is preferably manufactured from a high-strength injection moulded plastics material, such as ABS (acrylonitrile butadiene styrene), although it could also be made from appropriate metals such as aluminium or steel, or composite materials such a carbon fibre composite.

The robot 4 has a drive system which is operable to propel the robot about its environment and includes a pair of traction units 22 mounted one on either side of the body. Only one traction unit 22 is shown partially in FIG. 2, although it should be appreciated that the precise form of traction unit is not central to the present invention. However, in this particular embodiment the traction units 22 are in the form of electrically driven caterpillar-track units having a continuous rubberized belt or track constrained around leading and trailing pulley wheels, although wheels could also be used as an alternative. The traction units 22 are located on opposite sides of the main body 16 and are operable independently to enable to robot 4 to be driven in forward and reverse directions, to follow a curved path towards the left or right, or to turn on the spot in either direction depending on the speed and rotation direction of the wheels. Such an arrangement is common in mobile robot applications and so it will not be described in further detail here.

In order to clean the floor surface the robot also includes a cleaner head 24 that is supported on an underside of the main body 16 behind the traction units 22. Although not shown in the Figure, the cleaner head 24 includes a rotatable agitator that works to beat dirt from the floor surface. A suitable vacuum generator in the form of a motor and fan unit, also not shown, is provided in communication with the cleaner head 24 to draw dirt laden airflow into and through the cleaner head 24 and into the separating apparatus 18. The precise configuration of these components is not essential to the inventive concept so further detail is omitted but it should be noted that components such as cleaner heads, agitators and separating apparatus are known in the context of robotic vacuum cleaners.

The underside of the main body 16 also includes electrical contact means (not shown) comprising first and second electrical contacts that are supported on the underside of the robot body 16. Each of the first and second contacts are mounted in an aligned configuration and are operable to connect to the electrical contact means 8 on the docking station 6.

Figure 3:
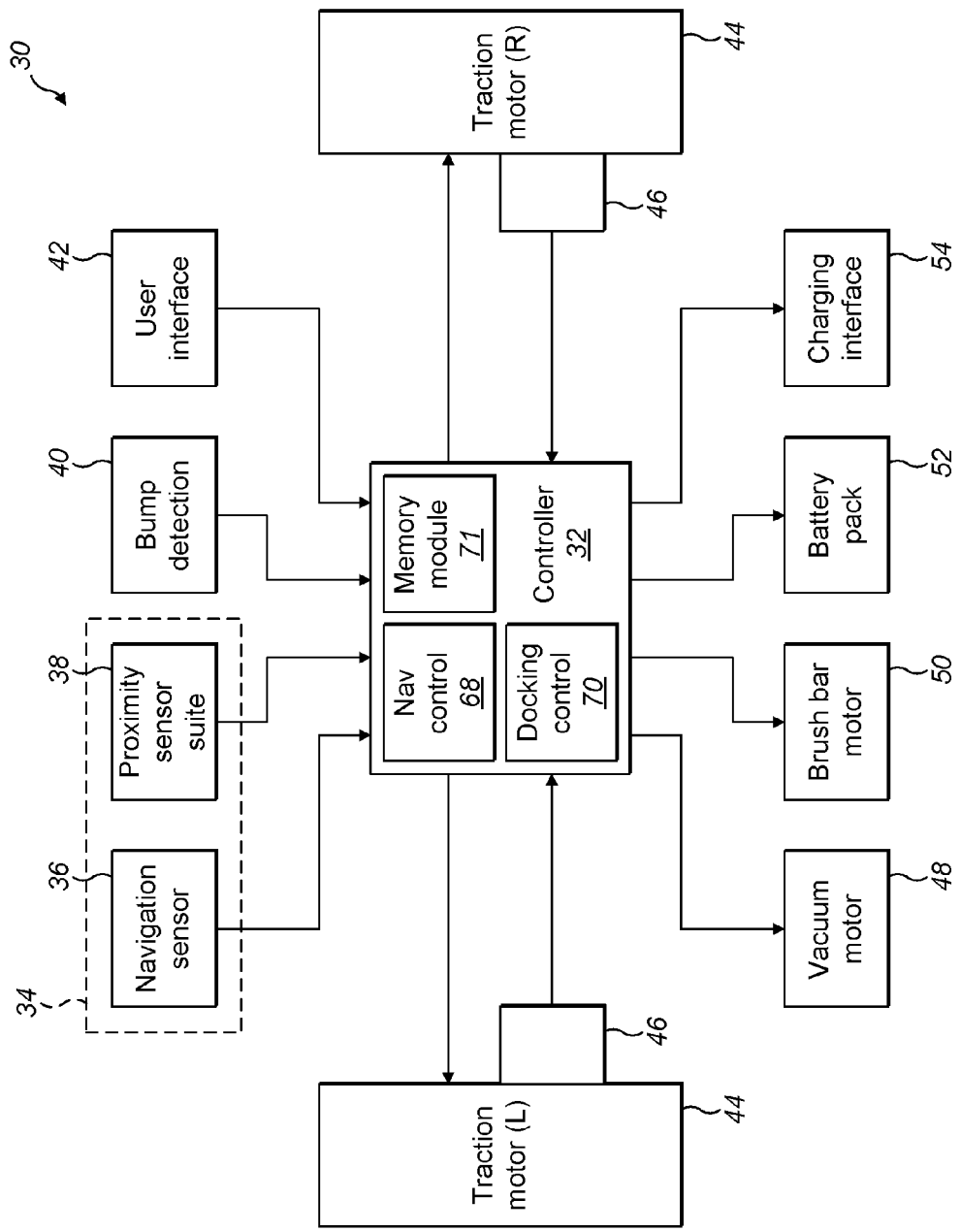
FIG. 3 is a system diagram of the electronic control system of the mobile robot.

FIG. 3 shows schematically a control system 30 of the robot 4 and its interfaces with the components described above. The control system 30 includes a controller 32 having appropriate control circuitry and processing functionality to process signals received from its various sensors and to drive the robot 4 in a suitable manner. The controller 32 is interfaced into a sensor suite 34 of the robot 4 by which means the robot 4 gathers information about its environment in order to map its environment and perform a cleaning route. The sensor suite 34 is also shown generally in FIG. 1 and includes a navigational sensor 36 which, in this embodiment, is a camera-based system in the form of an omnidirectional camera for providing the robot 4 with a panoramic view of its surroundings, and also a near-field proximity sensor array 38 to provide the robot 4 with the capability to detect obstacles. Finally, a bump detecting system 40 is provided although this is not illustrated in FIG. 1.

A user interface 42 is provided in order for a user to command the robot 4 to start/stop a cleaning process, for example. The user interface 42 is also shown generally in FIG. 1. The user interface 42 may take various forms, such as one or more mechanical buttons or even a graphical user interface with touch screen technology.

The controller 32 is also configured to supply drive signals to motors 44 associated with the traction units 22 and also to receive odometry data back from the traction units. For this purpose suitable rotational sensing means 46 such as rotary encoders are provided on the motors 44.

Suitable power and control inputs are provided to suction motor 48 and agitator motor 50. Finally, a power input is provided to the controller 32 from battery pack 52 and a charging interface 54 is provided by which means the controller 32 can carry out charging of the battery pack 52 when the battery supply voltage has dropped below a suitable threshold. It should be appreciated that the charging interface 54 is embodied by the electrical charging contacts provided on the underside of the robot 4, as described earlier.

Figure 4:
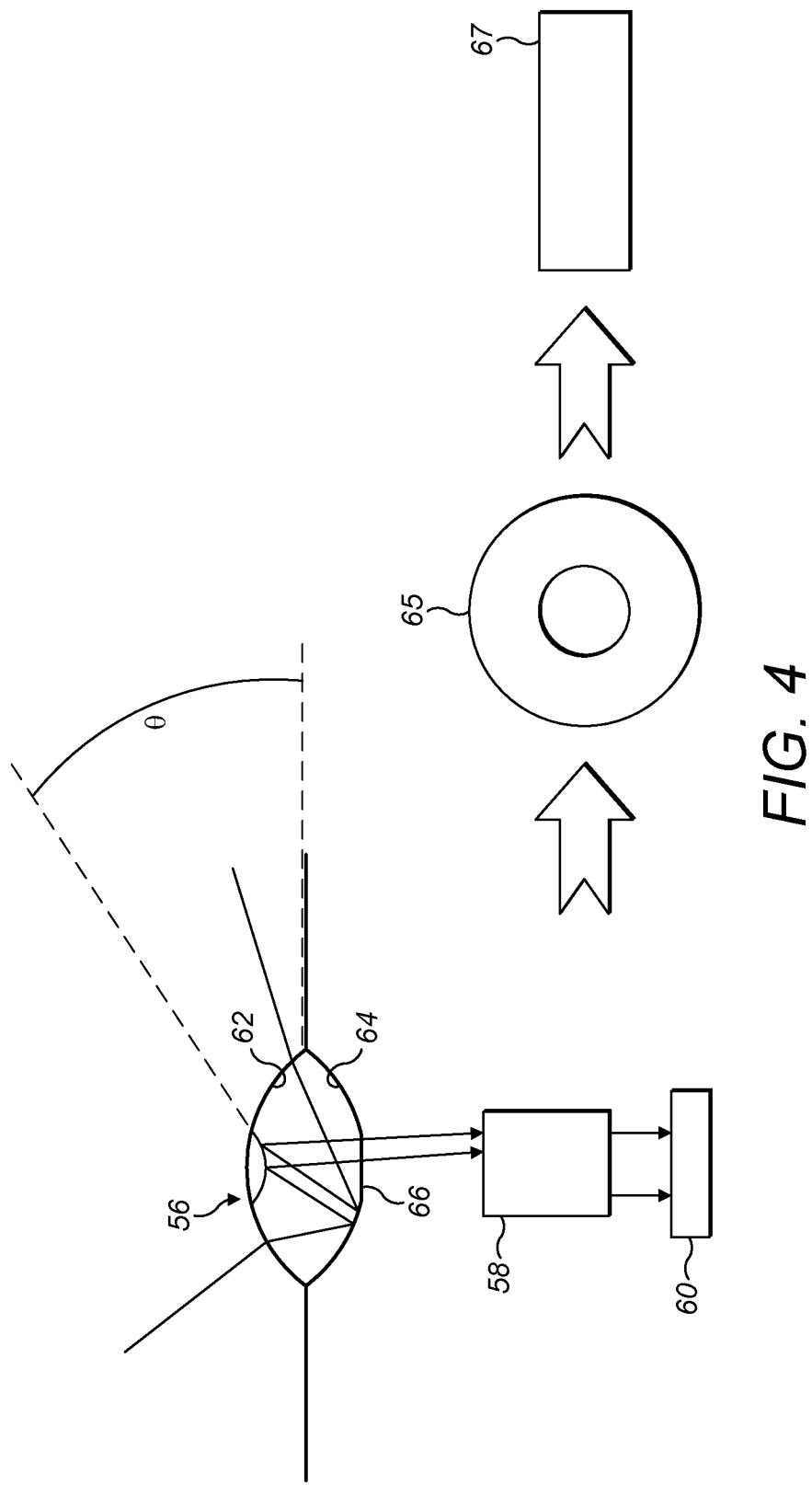
FIG. 4 is a schematic view of the navigation sensor of the robot.

The navigation sensor has been described briefly above as comprising an omnidirectional sensor 36. In more detail, and with reference also to FIG. 4, the navigation sensor 36 includes a panoramic annular lens 56 that is optically coupled to a focusing system 58 and a digital image sensor 60, for example a charge coupled device (CCD), as would be familiar to the skilled person. As shown in schematic form in FIG. 4 the panoramic annular lens 56 comprises a monolithic lens having a curved annular upper surface 62 and a curved annular lower surface 64. The upper surface protrudes from the cover of the robot 4 and defines a field of view θ of approximately 45 degrees of elevation around the perimeter of the robot 4.

Light that is incident on the lens 56 refracts through the upper lens surface 62, is reflected off the mirrored interior of the lower lens surface 64 and, subsequently, the upper surface 62 and passes through an exit pupil 66 provided in the lower lens surface 62. The exiting light is collimated by the focusing system onto the image sensor 60. As is shown, the resulting image 65 is an annular format but, to simplify processing of the image by the controller 32, suitable control circuitry is provided to transform the annular image into a subsequent image 67 that is in rectangular format. In this embodiment, the rectangular image 67 has a resolution of 1024 by 128 pixels, although it should be appreciated that these values are provided by way of example.

Returning to the control system 30 in FIG. 3, the controller 32 includes a navigation control module 68 that is responsible for guiding the robot 4 around a room to perform a cleaning function. The navigation control module 68 receives the image data from the navigation sensor 36 and is operable to locate itself within its surrounding environment and to run through a suitable cleaning pattern in order to vacuum the floor surface. In a preferred scenario, the robot 4 begins an operation located on the docking station 6 at the side of a room whereby the robot 4 will set its initial location on its internal map as its origin at 0,0 coordinates in a global reference frame. The robot 4 then proceeds to navigate around a room whilst cleaning whereby it returns to the docking station 6 at an appropriate time, for example when the charge level of the battery pack 52 is determined to be less than a predetermined threshold. The navigation control module 68 therefore implements suitable localization and mapping functionality to enable the robot 4 to navigate around a room and return to its original position which, in this scenario, is the location of the docking station. The precise workings of the navigation control module 68 are not central to the invention so further detail is not provided.

When returning the robot 4 to the docking station 6, the navigation control module 68 aims to place the robot 4 in front of and as close to the docking station 6 as possible. In practice, due to potential errors in the system, the navigation control module is able to place the robot 4 in front of the docking station allowing for an angular error, and within a predetermined maximum radius of the docking station, for example within 400 mm to 600 mm When this is achieved, control of the robot 4 is handed over to a docking control module 70, also provided as a functional part of the controller 32.

A memory module 71 is provided for storage of data generated and used by the navigation control module 68 and the docking control module 70 as well as for other tasks performed by the controller 32 which are not mentioned here. For example, the memory module 71 serves to store mapping data and route data generated and used by the navigation control module 68. The specific type of memory form is not central to the invention and will not be detailed here. Needless to say, however, that the memory module may be an appropriate on-board memory of the controller 32 and will have sufficient capacity and access speed for suitable acceptable of the controller 32.

The goal of the docking control module 70 is to guide the robot 4 onto the docking station 6 from its initial position within the predetermined distance and angular of the docking station 6 as delivered by the navigation control module 68. It achieves this by analyzing the image data to identify a pair of targets 73 provided on the docking station and inferring from the image data suitable control inputs to the traction units 22 to guide the robot 4 onto the docking station 6, as will be described in further detail later.

Figure 5:
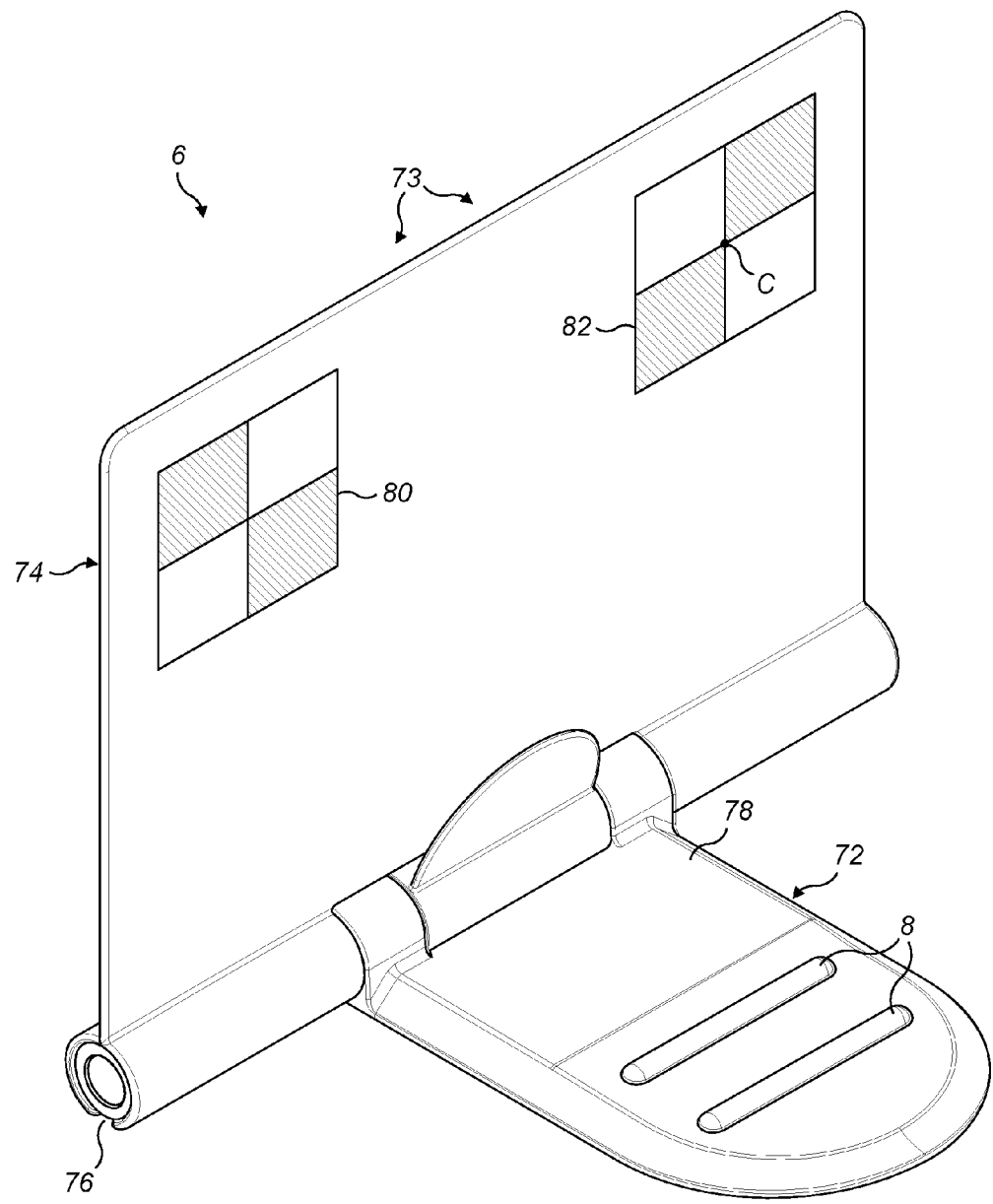
FIG. 5 is a perspective view of the docking station shown in FIG. 1.

The docking station 6 has been described in general terms above to place it in a suitable context. In more detail, and with reference to FIG. 5, the docking station 6 comprises two major components: a base portion 72 and a back portion 74 that is pivotable with respect to the base portion 72 into a folded or 'stowed' state.

The docking station 6 is positionable by a user in a room and, typically, the user will choose to position the base portion 72 so that a rear edge of it is adjacent a wall, as is shown in FIG. 1. The base portion 72 includes an elongate rear portion 76 and a platform 78 that extends forwardly from the rear portion 76. The base portion 72 takes the general form of a 'T' with the lateral bar of the T being the elongate rear portion 76 and the trunk of the 'T' being the forward platform 78. The platform 78 includes the electrical contact means 8 for establishing an electrical coupling with the robot 4 when it is an acceptable position with respect to the docking station 6.

Here, the docking station 6 is shown such in an unfolded or 'deployed' state such that the back portion 74 is oriented approximately at a right-angle to the base portion 64 so that the back portion 74 stands substantially upright. It should be noted that the docking station 6 may also be placed into a folded or 'stowed' state in which the back portion 74 pivots about the base portion 72 to lie generally flat against it. The back portion 74 is generally rectangular and substantially flat in this embodiment, although it will be appreciated that this is not essential.

The pair of targets 73 is carried on the back portion 74 of the docking station 6 so they are in a highly visible display position for the robot 4 when the docking station 6 is in a deployed state. The pair of targets 73 comprise a first fiducial marker or target 80 positioned on a left hand side of the back portion 74 and a second fiducial marker or target 82 positioned on the right hand side of the back portion 74. In this embodiment, the second target 82 is a mirror image of the first target 80, taken about a vertical plane, and is aligned with the first target 80 horizontally. Each of the targets 80, 82 comprises a monochrome two-by-two grid or array of squares that are contrasting in the manner of a chess or 'checkers' board. It is currently preferred for each of the targets 80, 82 to have essentially the same pattern since this simplifies the implementation of the target tracking algorithm implemented by the docking control module 70 and, in this embodiment, alternate elements of the grid are coloured black or white for maximum contrast. However, each target could be provided with a different pattern if desired and/or different colours if desired. For later reference, each target has a centre point 'C' that is in the centre of the grid.

The precise form of the targets 80, 82 is not crucial: they may be in the form of stickers or decals that are adhered onto the back portion 74 or, alternatively, they may be suitable labels that are incorporated into the plastics material of the back portion 74 during the fabrication process, for example.

Figure 6:
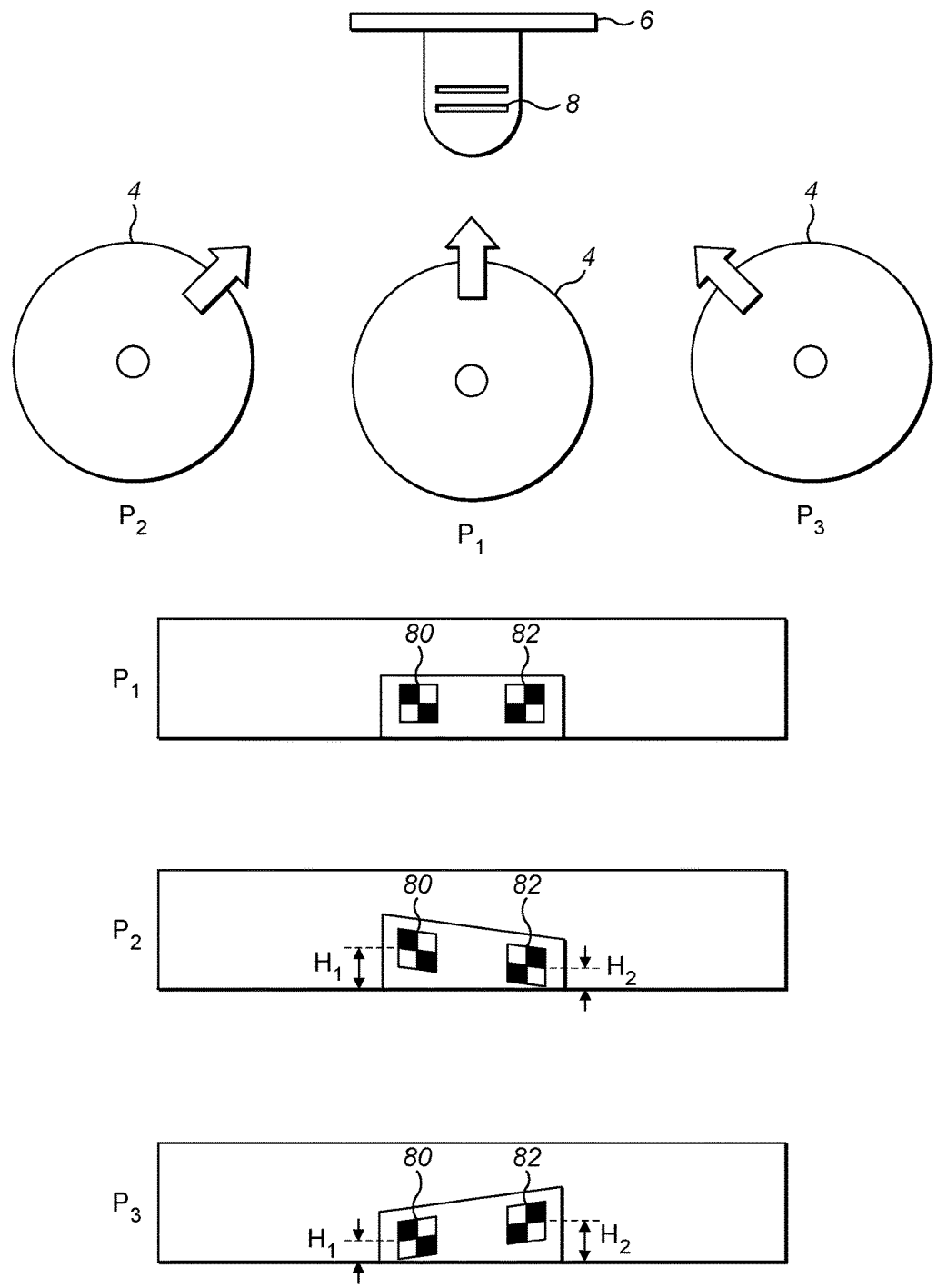
FIG. 6 is diagram illustrating a functional principle of the a docking control module of the robotic system.

The docking control module 70 is operable to identify the targets 80, 82 in the image data received from the navigation sensor 36 and to determine guidance information from the relative positions of the targets 80, 82 as they appear in the image. FIG. 6 is provided by way of explanation of this principle and shows a robot 4 in three positions P1, P2, P3 aligned laterally side-by-side in front of the docking station 6. The arrows on the front of the robots 4 in each position indicate their 'dead-ahead' orientation. Image frames corresponding to each of the three robot positions P1, P2 and P3 are also illustrated and, at this point, it should be mentioned that the scale of the docking station 6 in the respective image frame is not necessarily accurate to real-world data, but is stylized somewhat in order to explain the principle of operation more clearly.

In position P1, the robot 4 is directly in front of and faces the docking station 6. Referring firstly to the image frame P1, it will be noted that the docking station 6 is centred in the image and that each of the targets 80, 82 is aligned horizontally. More specifically, given the assumption that the robot 4 is on the same ground plane as the docking station, the pixel height of the centre points of each target 80, 82 is substantially equal.

Turning to the second robot position P2, it will be noted that the docking station 6 is still centred in the image since the robot is oriented such that its dead-ahead position is aligned with the docking station 6. However, because the robot position P2 is spaced laterally to one side of the docking station 6, the relative positions of the targets 80, 82 are shifted in the image due to the change in visual perspective. More specifically, the right hand target 82 is in a lower position in the image frame P1 compared to the left hand target 80. Expressed another way, the pixel height H1 of the centre point of the left hand target 80 is greater than the pixel height H2 of the centre point of the right hand target 82.

Comparing the third robot position P3 with the second robot position P2, it can be seen that the docking station 6 is still centred in the image frame, but because of the change in visual perspective in this image frame it is the left hand target 80 that is now in a lower position in the image frame compared to the right hand target 82. Expressed another way, the pixel height H1 of the centre point of the left hand target 80 is less than the pixel height H2 of the centre point of the right hand target 82.

By analyzing the pixel heights of the centre points of the two targets, and knowing that the first and second targets 80, 82, are in a predetermined relative spacing so as to be horizontally aligned on the display portion of the docking station 6, the docking control module 70 can determine whether the robot is to the right or the left of the docking station 6 and so can determine appropriate control signals for the traction units 22 in order to align the robot 4 with the docking station. For example, in position P2 the pixel height H2 of the right hand target 82 is in a relatively lower position, so the docking control module 70 can determine that it needs to move towards the right in order to align itself between the targets 80, 82. Further by evaluating the magnitude of the difference in pixel heights H1, H2 between the two targets, the docking control module 70 can infer information about how far it needs to move laterally in order to align itself with the targets 80, 82.

In all of the robot positions P1, P2 and P3 described above, the robot 4 is oriented so that it faces the docking station 6 and, therefore, the docking station 6 and targets 80, 82 appear in the centre of the image frames. It will be appreciated, however, that if the robot 4 was not oriented in this way, then the docking station 6 would appear at a different lateral position in the image. The robot 4 may therefore infer its orientation relative to the docking station 6 from the lateral position of the targets 80, 82 in the image.

Figure 7:
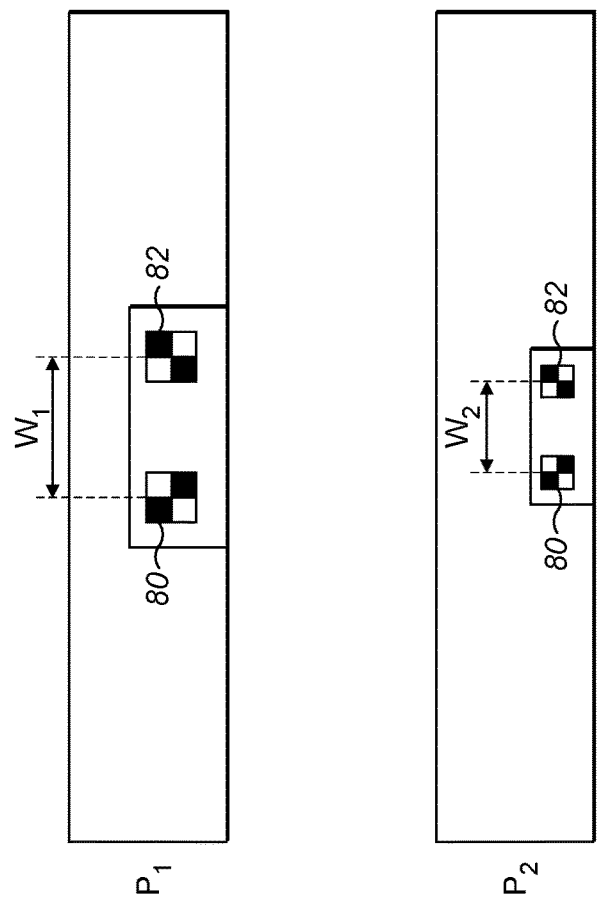
FIG. 7 is a diagram illustrating a further functional principle of the docking control system of the robotic system.
Figure 7:
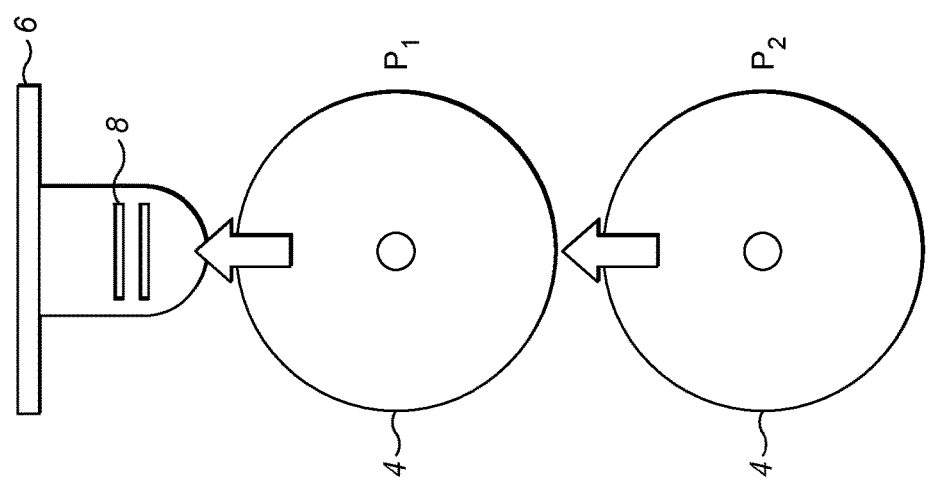

A similar principle can be used by the docking control module 70 to determine the distance between the robot 4 and the docking station 6. With reference now to FIG. 7, two alternative robot positions P1, P2 are shown in an aligned position, one behind the other, and oriented to face directly towards the docking station 6. As in FIG. 6, image frames corresponding to each robot position P1, P2 are also provided.

At position P1, the robot 4 is closer towards the docking station than in position P2 and the docking station is centred in the image frame, each of the targets 80, 82 being aligned horizontally. Comparing this with the second position P2, it can be seen that in the image frame P2 the docking station 6 is also aligned in the centre of the image frame, but that the two targets 80, 82 are closer to each other than in the first position P1. Expressed another way, the pixel width W2 between the centre point of the left hand target 80 and the centre point of the right hand target 82 is less in the second position P2 than the pixel width W1 in the first position P1. Therefore, by analyzing the pixel widths W1, W2 between the centre points of the two targets 80, 82, and knowing that the first and second targets 80, 82 are in a predetermined relative distance from one another, the docking control module 70 is able to infer information regarding the distance of the robot 4 from the docking station 6.

The above discussion explains the principle by which the docking control module 70 determines information about the direction and distance the robot 4 must move in order to be guided towards the docking station 6. By way of further explanation, a routine 99 implemented by the docking control module 70 during a docking procedure is shown in FIG. 8, and this will now be described together with a worked example of a docking procedure with reference also to FIG. 9 that shows a movement pattern taken by a robot 4 during a docking procedure.

Figure 8:
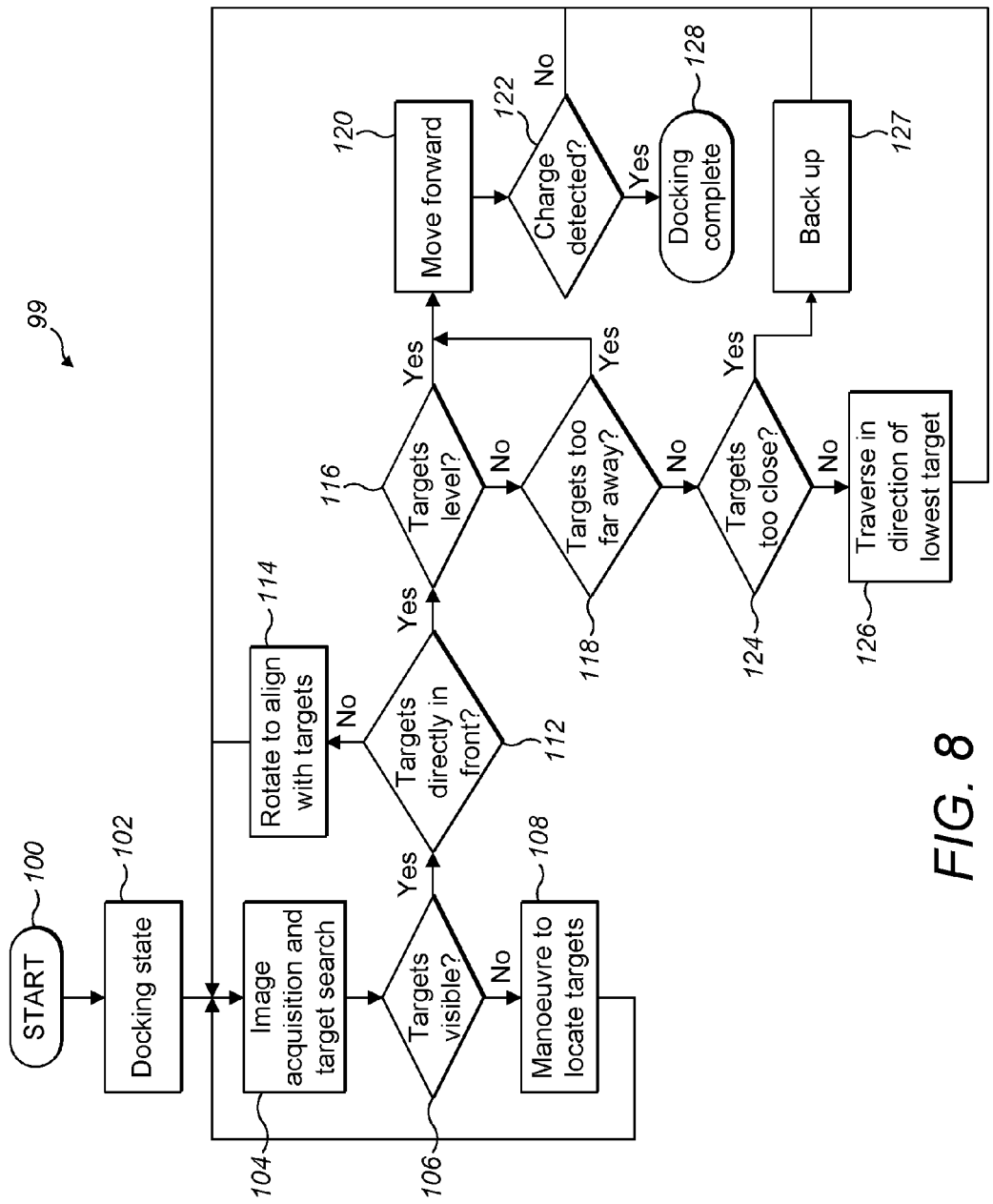
FIG. 8 is a flow diagram representing a docking control routine implemented in the robot.

Referring to FIG. 8, the routine is initiated at step 100 when the navigation control module 68 returns the robot 4 within an accessible range of the docking station 6 and passes drive control over to the docking control module 70. The robot 4 therefore enters the docking state at step 102 following which the docking control module 70 performs a 'target search' at image acquisition step 104 by acquiring an image frame from the navigation sensor 36 and searching the image frame for the targets 80, 82.

To identify the presence of the targets 80, 82 in the image, it is currently preferred that the docking control module 70 implements a type of accelerated segment test algorithm known as 'FAST feature detector' that is tuned suitably to identify a pattern as set out in the targets 80, 82, and such a feature detecting algorithm would be understood by the skilled person. However, other feature detection algorithms are acceptable, as long as they are robust at identifying the target pair in an image frame, and preferably a relatively low resolution image as used in this embodiment.

Moving on from image acquisition step 104, the routine junctures at decision step 106 depending on whether the targets 80, 82 have been identified in the acquired image frame. Referring now to the worked example in FIG. 9, it will be seen that the robot 4 is positioned to the left of the docking station 6 and lies in zone 'A' which represents an area within which the docking control module 70 cannot 'see' the targets reliably. In this scenario, the routine enters a maneuvering step 108 in which the robot starts to perform a predetermined target search manoeuvre. In this embodiment, the robot 4 starts to spiral outwards from its start point, although it should be appreciated that other manoeuvring patterns could be acceptable. For example, the robot 4 could be programmed to move side-to-side in increasing steps.

Figure 9:
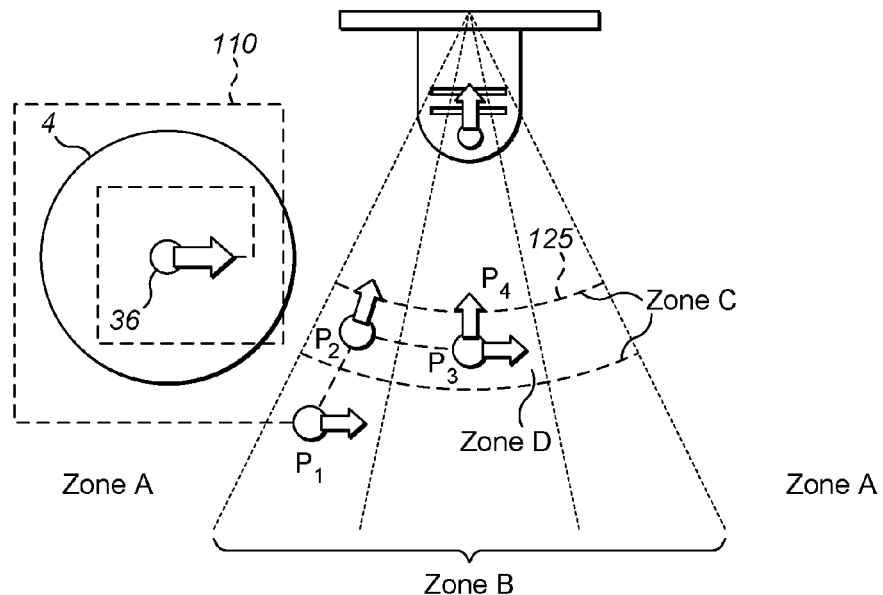
FIG. 9 is a diagram that illustrates a manoeuvring of the robot during the docking control routine of FIG. 8.
Figure 9:
Figure 9:
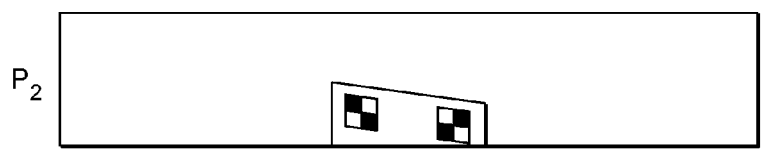
Figure 9:
Figure 9:
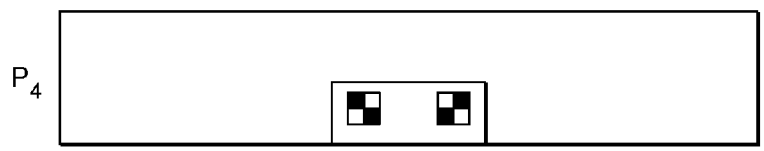

Whilst the robot 4 is manoeuvring along its spiral 'target search' path, shown in FIG. 9 at 110, the routine 99 loops through steps 104, 106 and 108 to acquire an image frame and determine where the targets 80, 82 are visible in the image. Preferably, the routine loops through these steps at approximately 5-10 Hz which currently is considered to strike a balance between maximizing the effectiveness of the target search function whilst avoiding a high impact on processor overhead.

As can be seen in FIG. 9, the robot 4 travels along the spiral target search path until it reaches position P1, within zone B, at which point the 'target search' function is able to identify the targets 80, 82 in the image frame. The routine 99 therefore flows to decision step 112 that establishes whether the targets 80, 82 are directly in front of the robot 4. It should be noted that Zone B is represented by an angular region about the centreline of the docking station in which the targets should be visible by the robot. For present purposes, zone B has an angular range of approximately 45 degrees.

The orientation of the robot 4 is indicated by the arrow and at position P1 it is oriented generally parallel to the docking station 6. A representative image of position P1 is also shown in FIG. 9 and it can be seen that the docking station 6 lies towards the left hand side of the image frame since the robot 4 travelling direction is not aligned with the targets 80, 82. Due to the position of the targets 80, 82 in the image frame at position P1, the decision step 112 is negative and so the routine proceeds to step 114 which causes the robot 4 to rotate to align it with the targets 80, 82. The routine then loops through steps 104 to 112 until the robot 4 is aligned with the docking station 6. At this point in the discussion, it should be appreciated that the docking station 6 has, in effect, moved relative to the image frame so as to be centred therein, although its visual perspective has not changed.

Once the targets 80, 82 are directly in front of the robot 4, the routine passes to step 116 at which it is determined whether the centre points C of the each target 80, 82 are substantially aligned in the image. To accomplish this, the docking control module 70 analyses the difference in height between the centre points of each target 80, 82 that it has acquired in the most recent image, as described earlier with reference to FIG. 6. In the FIG. 9 example, at position P1 the visual perspective of the docking station 6 means that the left hand side target 80 is at a higher position in the image compared to the right hand side target 82. Therefore, decision step 116 is answered negatively and the process flow passes to decision step 118 where it is established whether the docking station 6 is too distant. To accomplish this, the docking control module 70 compares the pixel distance W between the centre points of the targets 80, 82 in the image (hereinafter the 'target pixel separation') and compares this value to a predetermined value that is set to demarcate an acceptable distance that the robot 4 may be from the docking station 6 before starting its 'docking run'. In effect, therefore, the predetermined target pixel separation establishes zone C which is considered to be an ideal distance zone for the robot 4 to be from the docking station 6 in order to prepare for a successful docking run. The overall aim of the docking control module 70 is to position the robot 4 in zone C in order to prepare the robot 4 for a docking run.

In the example of FIG. 9, the robot 4 is beyond zone C, but in the angular range of zone B, causing decision step 118 is answered positively and so process flow passes to step 120 at which the robot 4 is caused to move forwards. Following this the routine checks the charging system on the robot 4 to determine whether a charge has been detected at step 122, answered negatively in this example, whereby the process loops back to the image acquisition and target search step 104. Since the targets 80, 82 are visible to the robot 4, and since the robot 4 is aligned with the target 80, 82, the process loops back through steps 118, 120 and 122 until it is no longer determined that the targets 80, 82 are too far away.

Expressed another way, the 'move forward' action will continue until the docking control module 70 determines that the target pixel separation is greater than or equal to a predetermined minimum value. The robot 4 has therefore arrived at position P2 illustrated on FIG. 9.

Now in the position P2, the process loops through steps 102 to 118, as explained above, but the decision step 118 is now answered negatively and the process flow moves to a further decision step 124. In a similar manner to step 118, at step 124 the docking control module 70 analyses the target pixel separation and determines whether it exceeds a predetermined maximum value, which establishes the inner boundary 125 of zone C and, in doing so, the docking control module 70 determines whether the robot is still in zone C and is not too close to the docking station 6. In the event that the robot 4 travelled out of zone C so as to be too close to the docking station 6, the decision step 124 would be answered negatively and step 127 would cause the robot 4 to execute a reverse manoeuvre until the robot 4 is positioned into zone C.

Since at position P2 the robot 4 is still in zone C, step 124 is answered negatively so that the process flow passes to step 126. Step 126 is a manoeuvring step and the docking control module 70 analyses the relative pixel heights of the centre points of the two targets as explained above with reference to FIG. 6, and commands the robot 4 to traverse across zone C for a predetermined distance in the direction of the lowest target, which in this case is the right hand target 82. The predetermined distance may be either a fixed value or, preferably, may be linked to the misalignment of the targets. For example, the greater the misalignment of the targets, the greater distance the robot traverses through zone C, although it may be preferable for the robot to take the traversal in relatively small steps in order to prevent overshoot. Once the robot 4 has completed its traversal movement, it rotates once again to align itself with the targets. The reason for this is to guard against the effects of the robot pitching forward or backwards during movement which may cause the targets to be 'tilted' if they are not viewed from directly in front.

This manoeuvre is illustrated in FIG. 9 in which the robot 4 traverses from position P2 to position P3. During this manoeuvre, the routine loops through steps 104 to 126 until the two targets 80, 82 become substantially aligned horizontally in the image, such that the robot 4 now resides in zone 'D' at position P3.

At position P3, the targets are aligned horizontally, as is shown in the corresponding image frame but it will be appreciated that the targets 80, 82 are not aligned directly in front of the robot 4 since the docking station 6 is off to the left hand side of the image frame. The process flow therefore loops through steps 112 and 114 in order to align the targets 80, 82 in the image frame and to reach position P4.

At position P4, the robot 4 has been manoeuvred into an ideal position to conduct a 'docking run' onto the docking station because it is in the middle of zone D and is aligned directly with the docking station 6. Accordingly, the process continues through steps 112 and 116 to step 120 at which the robot 4 is commanded to move forwards. The process continues through the charge detection step 122 and continues around the loop until this decision step 122 can be answered positively, which is when the robot 4 has successfully manoeuvred itself onto the docking station 6 so as to engage the electrical contact means 8. When charge has been detected at step 122, the routine continues to step 128 at which point the docking procedure is considered complete and the docking control module 70 places the robot into a standby mode during a recharging process.

From the above explanation, it will be appreciated that the docking control module 70 is effective at guiding the robot 4 from a range of positions in the proximity of the docking station 6 to arrive at the docking station 6 in order to establish electrical contact with the charging contacts 8. Advantageously, the docking control module 70 operates in a heuristic manner and the analysis of the relative positions of the targets 80, 82 in the image frame to infer guidance information avoids complex geometrical calculations that may impose a heavy processing burden on the system and which may be more heavily affected from noise within the visual sensing system. Of course, it is not essential that the robot 4 be charged at the docking station 6 and it may be necessary for the robot to dock for another purpose. For example, the docking station 6 may be provided with a vacuum system which is engageable with the robot in order to empty the dirt from the separation system without needing intervention by a user.

The robot 4 has been described as having an omnidirectional vision system and such a system is useful in mobile robotic applications since it provides an all-round view of the robot environment. However, the invention is not limited to being used with an omnidirectional vision system. For example, the robot 4 may instead be provided with a monocular camera oriented in the dead-ahead position and, in such a configuration, the target search function would require the robot 4 also to rotate in order to capture an all-round view of its environment. Although such a process would be more time consuming, and marginally more computationally complex, it would still be feasible.

Furthermore the invention is not limited to the form of docking station described here and is applicable to a docking station of any shape. However, the important factor is that the docking station should have appropriate display surfaces so as to be able to present a target pair in an upright orientation so that they can be image captured by the robot.

Although a pair of targets have been described, the invention is also applicable to more than two targets.

Whilst the robot 4 has been described above as a vacuum cleaning robot, it will be appreciated that this is merely to put the invention into a suitable context. In fact, the invention is applicable to other mobile robotic applications or, indeed, any autonomous vehicle, which needs a robot/vehicle to dock with a docking station. For example security/maintenance robots may need to return to a docking station to recharge or to pick up tools, and lunar rovers may need to dock with a station in order to deposit collected soil samples. In addition, a semi- or fully-autonomous electric passenger vehicle may need to be able to dock with a socking station in order to engage a charging point. Most usefully, perhaps, the invention may be applied to mobile robotic domestic surface treating appliances such as autonomous vacuum cleaners, lawn mowers, floor surface polishers, to name a few examples.

The invention claimed is:

1. An apparatus for guiding an autonomous vehicle towards a docking station comprising:
    an autonomous vehicle provided with a camera-based sensing system, a drive system for driving the autonomous vehicle, and a control system for controlling the drive system; and
    a docking station including a first fiducial marker and a second fiducial marker, wherein the second fiducial marker is positioned on the docking station to define a predetermined relative spacing with the first fiducial marker;

wherein the control system is configured to receive an image provided by the camera-based sensing system, the image including a representation of the first and second fiducial markers, and to control the drive system so as to guide the autonomous vehicle towards the docking station based on a difference between the representation of the first and second fiducial markers in the image and the predetermined relative spacing between the first and second fiducial markers, and wherein the control system is configured to:
compare a relative distance between the representation of the first fiducial marker and the representation of the second fiducial marker in the image with a predetermined threshold value,
in response to determining that the relative distance is less than the predetermined threshold value without performing any geometrical calculation using the predetermined threshold value, control the drive system to cause the autonomous vehicle to perform a first movement, and
in response to determining that the relative distance is greater than the predetermined value without performing any geometrical calculation using the predetermined threshold value, control the drive system to cause the autonomous vehicle to perform a second movement that is different than the first movement.

2. The apparatus of claim 1, wherein the control system is further configured to:
store data relating to the predetermined relative spacing between the first fiducial marker and the second fiducial marker;
search for and identify the representation of the first and second fiducial markers in the image;
evaluate a relative position of the first and second fiducial markers in the image;
compare the evaluated relative position of the first and second fiducial markers to the predetermined relative position of the first and second fiducial markers;
control the drive system in dependence on the comparison in order to guide the autonomous vehicle towards the docking station.

3. The apparatus of claim 1, wherein the control system is configured to compare a horizontal alignment between the first and second fiducial markers in the image.

4. The apparatus of claim 1, wherein the first fiducial marker and the second fiducial marker are located on a display portion of the docking station that is in an upright orientation when the docking station is placed on a floor surface.

5. The apparatus of claim 4, wherein the display portion of the docking station that carries the first and second fiducial markers is planar.

6. The apparatus of claim 1, wherein each of the first and second fiducial markers defines a pattern, and wherein the pattern of the first fiducial marker is the same as the pattern of the second fiducial marker.

7. The apparatus of claim 6, wherein the pattern is a grid comprising four squares in a two-by-two arrangement, wherein alternate squares in the grid are contrasting colors.

8. The apparatus of claim 1, wherein each of the first and second fiducial markers defines a pattern, and wherein the pattern of the first fiducial marker is the mirror image of the pattern of the second fiducial marker.

9. The apparatus of claim 1, wherein the camera-based sensing system includes an omni-directional camera.

10. The apparatus of claim 1, wherein the vehicle is an autonomous surface treating appliance.

11. The apparatus of claim 1, wherein the first movement drives the autonomous vehicle closer to the docking station.

12. The apparatus of claim 11, wherein the predetermined threshold value is a predetermined minimum threshold value.

13. The apparatus of claim 1, wherein the second movement drives the autonomous vehicle away from the docking station.

14. The apparatus of claim 1, wherein the control system is configured to control the drive system to drive the autonomous vehicle laterally with respect to the docking station in response to determining that the relative distance between the first fiducial marker and the second fiducial marker in the image is greater than a predetermined minimum threshold value and less than a predetermined maximum threshold value without performing any geometrical calculation using either of the predetermined minimum threshold value or the predetermined maximum threshold value.

15. A method of controlling an autonomous vehicle to guide the vehicle towards a docking station, the docking station including a first fiducial marker and a second fiducial marker, wherein the second fiducial marker is positioned on the docking station to define a predetermined relative spacing with the first fiducial marker, the method comprising:
capturing an image, by a camera-based sensing system of the autonomous vehicle, the image including a representation of the first fiducial marker and the second fiducial marker; and
controlling a drive system of the autonomous vehicle, by a control system of the autonomous vehicle, so as to guide the autonomous vehicle towards the docking station based on a difference between the representation of the first and second fiducial markers in the image and the predetermined relative spacing between the first and second fiducial markers by:
comparing a relative distance between the representation of the first fiducial marker and the representation of the second fiducial marker in the image with a predetermined threshold value,
in response to determining that the relative distance is less than the predetermined threshold value without performing any geometrical calculation using the predetermined threshold value, control the drive system to cause the autonomous vehicle to perform a first movement, and
in response to determining that the relative distance is greater than the predetermined value without performing any geometrical calculation using the predetermined threshold value, control the drive system to cause the autonomous vehicle to perform a second movement that is different than the first movement.

16. The method of claim 15, further comprising:
storing data relating to the predetermined relative spacing between the first fiducial marker and the second fiducial marker;
searching for and identifying the representation of the first and second fiducial markers in the image;
evaluating a relative position of the first and second fiducial markers in the image;
comparing the evaluated relative position of the first and second fiducial markers to the predetermined relative position of the first and second fiducial markers;
controlling the drive system in dependence on the comparison in order to guide the autonomous vehicle towards the docking station.

17. The method of claim 15, including comparing a horizontal alignment between the first and second fiducial markers in the image.

18. A non-transitory computer readable medium comprising program code instructions that, when carried out on an autonomous vehicle, cause the autonomous vehicle to:
- capture an image, by a camera-based sensing system of the autonomous vehicle, of a docking station that includes a first fiducial marker and a second fiducial marker, wherein the second fiducial marker is positioned on the docking station to define a predetermined relative spacing with the first fiducial marker and the image includes a representation of the first fiducial marker and the second fiducial marker; and
- control a drive system of the autonomous vehicle, by a control system of the autonomous vehicle, so as to guide the autonomous vehicle towards the docking station based on a difference between the representation of the first and second fiducial markers in the received image and the predetermined relative spacing between the first and second fiducial markers by:
  - comparing a relative distance between the representation of the first fiducial marker and the representation of the second fiducial marker in the image with a predetermined threshold value,
  - in response to determining that the relative distance is less than the predetermined threshold value without performing any geometrical calculation using the predetermined threshold value, control the drive system to cause the autonomous vehicle to perform a first movement, and
  - in response to determining that the relative distance is greater than the predetermined value without performing any geometrical calculation using the predetermined threshold value, control the drive system to cause the autonomous vehicle to perform a second movement that is different than the first movement.

* * * * *